(12) United States Patent
Chang et al.

(10) Patent No.: US 7,479,313 B2
(45) Date of Patent: Jan. 20, 2009

(54) THERMOPLASTIC RESIN-LAMINATED STRUCTURE, METHOD FOR PREPARATION AND USE THEREOF

(75) Inventors: Hong-Geun Chang, 1-302 Acadaytown, 156 Bakdal 2-dong, Manan-gu, Anyang-si, Gyeonggi-do (KR); Jung-Sook Kang, Seoul (KR); Mi-Hyang La, Daejeon (KR)

(73) Assignee: Hong-Geun Chang, Anynag-si (KR)

( * ) Notice: Subject to any disclaimer, the term of this patent is extended or adjusted under 35 U.S.C. 154(b) by 0 days.

(21) Appl. No.: 11/982,098

(22) Filed: Oct. 31, 2007

(65) Prior Publication Data

US 2008/0063847 A1    Mar. 13, 2008

Related U.S. Application Data

(60) Continuation of application No. 11/123,186, filed on May 6, 2005, which is a division of application No. 10/175,008, filed on Jun. 20, 2002, now abandoned.

(30) Foreign Application Priority Data

Jun. 20, 2001   (KR) ........................... 2001-0035023

(51) Int. Cl.
*B32B 7/02*    (2006.01)
*B32B 7/06*    (2006.01)
*B32B 15/08*   (2006.01)

(52) U.S. Cl. ..................... 428/31; 428/213; 428/457

(58) Field of Classification Search .............. None
See application file for complete search history.

(56) References Cited

U.S. PATENT DOCUMENTS 2,662,045 A    12/1953  Baggott (Continued)

FOREIGN PATENT DOCUMENTS

| JP | 49-129291 | 10/1974 |
|---|---|---|
| JP | 4-363242 | 12/1992 |
| JP | 2000-021552 | 1/2000 |
| KR | 92-16247 | 9/1992 |
| WO | WO 99/61237 | 12/1999 |

OTHER PUBLICATIONS

English language translation of JP 04-363242, Dec. 1992.
Encyclopedia of Polymer Science and Engineering, vol. 7: Fillers, Mar. 1988.
English language-version of Preliminary Rejection Letter issued by the Japanese Patent Office in counterpart Japanese Patent Application No. 2002-179813.

*Primary Examiner*—Ramsey Zacharia
(74) *Attorney, Agent, or Firm*—Finnegan, Henderson, Farabow, Garrett & Dunner, L.L.P.

(57) ABSTRACT

Systems and methods consistent with the present invention provide a thermoplastic resin-laminated structure having an exterior layer, a base layer, and a binding layer that is placed between the exterior layer and the base layer. The exterior, base and binding layers include at least one material selected from a group consisting of electric resistance-heat generating materials and heat-conductive materials, and has at least one connection terminal at a certain region for supplying at least one of electricity or heat. The resin-laminated structure has excellent properties such as adhesive strength between a base layer and an exterior layer, and recycling utility as well as surface quality in feeling, thermal durability, acoustic absorptivity, heat-shielding property, and impulse-durability. Therefore, it can be used for interior automotive trims, acoustic absorptive members, heat-insulating members, lagging members, protective coating members, anti-vibration members, and sound-blocking members for civil engineering and construction, anti-vibration and sound-blocking members for sewage and water pipe, soundproofing members for hot-water "ondol", plastic furniture, various multi-layer mats, handles, sofas, chairs, various toys, middle soles of shoes, and golf bags. A method for preparing the resin-laminated structure is also provided.

12 Claims, 1 Drawing Sheet

U.S. PATENT DOCUMENTS

| | | |
|---|---|---|
| 3,671,346 A | 6/1972 | Tsuzuki |
| 3,718,535 A | 2/1973 | Armstrong et al. |
| 4,038,120 A | 7/1977 | Russell |
| 5,389,184 A | 2/1995 | Jacaruso et al. |
| 5,932,306 A | 8/1999 | Usui |
| 6,656,858 B1 | 12/2003 | Cahill |

THERMOPLASTIC RESIN-LAMINATED STRUCTURE, METHOD FOR PREPARATION AND USE THEREOF

This application is a continuation application of U.S. application Ser. No. 11/123,186, filed May 6, 2005, which is a divisional application of U.S. application Ser. No. 10/175,008, filed Jun. 20, 2002, now abandoned which claims the benefit of priority of Korean Application No. 2001-0035023, filed Jun. 20, 2001. These applications are hereby incorporated by reference in their entirety.

FIELD OF THE INVENTION

The present invention relates to a resin-laminated structure, method for preparation and use thereof, and in particular to a thermoplastic resin-laminated structure which has excellent properties such as adhesive strength between a base layer and an exterior layer, and recycling utility as well as surface quality in feeling, thermal durability, acoustic absorptivity, heat-shielding property, and impulse-durability, method for preparation and use thereof.

BACKGROUND OF THE INVENTION

Polymer resin-laminated structures are designed pursuant to their application purposes. Generally, resin moldings having different properties and/or made by different molding methods are bound to form a resin-laminated structure having new features. For preparing an interior automotive trim (e. g., instrument panel), an exterior layer of soft resin prepared by sheet molding and a base layer of quite hard resin prepared by injection molding are bound to form a resin-laminated structure having excellent strength, impulse-durability and acoustic absorptivity together with soft surface quality in feeling.

The resin-laminated structures consisting of the exterior layer and the base layer are fabricated by independently molding the exterior layer and the base layer and binding them to each other. This binding between the exterior layer and the base layer is performed with thermal vacuum molding or thermal adhesion molding. These binding methods are described below.

Vacuum molding methods are disclosed in Korean Patent Laid-Open No. 199958663 and Japanese Patent Laid-Open No. Hei11-343477. According to these patent applications, an exterior layer of soft polyvinylchloride sheet is fixed to a mold with vacuum adsorption, and a base layer of polycarbonate composite resin is also fixed to the mold. After the objects to be adhered are sufficiently pre-heated, polyurethane foaming material including adhesive material is injected between the exterior layer and, the base layer to perform foaming and compression molding. This vacuum molding method has an advantage that the adhesive strength between the exterior layer and the base layer is good, because the objects, namely polyvinylchloride, polycarbonate and polyurethane, are all polar resins.

However, this method has shortcomings: expensive vacuum apparatus and compressive equipment operated at high pressure are required, the objects may be deformed during the pre-heating, recycling of the used materials is impossible because it is not-easy to extricate the resin-laminated structure into pieces, the non-uniformity of foaming material may produce inferior products, shrinkage and irregularities may happen to the exterior layer when both vacuum and heat are supplied, and finally the plasticizer included in soft polyvinylchloride is harmful to humans.

A thermal adhesion molding method, which is more advanced in view of recycling used materials than the vacuum molding method as described above, is disclosed in Japanese Patent Laid-Open No. Hei12-282001 and Korean Patent Laid-Open No. 199943059. According to these patent applications, the thermal adhesion molding method is a method that after an exterior layer of polyolefin resin and a base layer of polyolefin composite resin are sufficiently preheated, the objects are compressed at high pressure using an adhesive agent therebetween or heat to form a resin-laminated structure. This thermal adhesion molding method has an advantage that the resin-laminated structure can be recycled.

However, this method has shortcomings. The base layer consists of polyolefin resin as a non-polar resin which lacks strength and whose adhesive force to the exterior layer is not good; thus the exterior layer may be stripped from the base layer, the working environment is not pleasant due to a malodor of adhesive agent and the like, the objects may be deformed during the pre-heating, and equipment operated at high temperature and pressure is additionally required.

In order to improve the shortcoming of the deterioration of adhesive force between the base layer and the exterior layer as described above, a method proposed is that a primer layer should be previously coated on the base layer, or that the base layer or the exterior layer be surface-treated with plasma, corona, electron ray, high frequency wave, heating by hot air, or flame treatment.

The above-mentioned method can improve the adhesive force between the base layer and the exterior layer. However, the method has shortcomings. In the former case of previously coating the primer layer on the base layer some processes should be added and thus the productivity decreases, whereas in the latter case of surface-treating the base layer and the exterior layer, additional expensive equipment is essential and thus the fabrication cost increases.

SUMMARY OF THE INVENTION

To overcome the above-mentioned shortcomings, it is therefore an object of the present invention to provide a thermoplastic resin-laminated structure that has excellent properties such as adhesive strength between a base layer and an exterior layer, and recycling utility as well as surface quality in feeling, thermal durability, acoustic absorptivity, heat-shielding property, and impulse-durability.

Another object of the present invention is to provide a preparation method for the thermoplastic resin-laminated structure, in which no extra expensive vacuum apparatus is needed, the manufacturing process is simple enough to reduce the manufacturing cost and productivity is very good, as well as, decrease the use of harmful chemicals such as adhesive agents to the extent that unpleasantness due to malodor is decreased during production processes and use of the final product.

It is also another object of the present invention to provide uses of the thermoplastic resin-laminated structure.

To achieve the above-mentioned objects of the present invention, a thermoplastic resin-laminated structure comprises an exterior layer, a base layer, and a binding layer which is placed between the exterior layer and the base layer, wherein the binding layer includes at least one material selected from a group consisting of electric resistance-heat generating materials and heat-conductive materials, and has at least one connection terminal at a certain region for supplying electricity and/or heat.

To achieve the above-mentioned objects of the present invention, a method for preparing a thermoplastic resin-laminated structure comprises the steps of intervening a binding layer between an exterior layer and a base layer, wherein the binding layer includes at least one material selected from a group consisting of electric resistance-heat generating materials and heat-conductive materials, and has at least one connection terminal at a certain region for supplying electricity or heat, and supplying electricity or heat to the binding layer through the terminal to bind the base layer with the exterior layer.

To achieve the above-mentioned objects of the present invention, a method for preparing a thermoplastic resin-laminated structure comprises the steps of preparing a double-layer sheet in which an exterior layer is bound to a binding layer which includes at least one material selected from a group consisting of electric resistance-heat generating materials and heat-conductive materials, and has at least one connection terminal at a certain region for supplying electricity or heat, putting a base layer on the binding layer of the double-layer sheet, and supplying electricity or heat to the binding layer through the terminal to bind the base layer with the exterior layer.

In this method, in view of work preferably a laminated sheet molding apparatus should be used for preparing the double-layer sheet.

To achieve the above-mentioned objects of the present invention, the thermoplastic resin-laminated structure is used for interior automotive trims, members for civil engineering and construction such as acoustic absorptive members, heat-insulating members, lagging members, protective coating members, anti-vibration members and sound-blocking members, anti-vibration and sound-blocking members for sewage and water pipe, soundproofing members for hot-water "ondol", (i. e., Korean word indicating floor heating system), plastic furniture, various multi-layer mats, handles, sofas, chairs, various toys, middle soles of shoes, and golf bags.

In this invention, the electric resistance-heat generating material or the heat-conductive material is selected from a group consisting of tungsten (W), nickel (Ni), chromium (Cr), silicon (Si), aluminum (Al), carbon (C), Iron (Fe), magnesium (Mg), zinc (Zn), titanium (Ti), manganese (Mn), cobalt (Co), vanadium (V), zirconium (Zr), molybdenum (Mo), copper (Cu), silver (Ag), cadmium (Cd), tin (Sn), lead (Pb), stainless steel, their alloys, and their mixtures, and is used in the form of plate type, mesh, solid powder, and thin film coated on a resin film.

The binding layer is selected from a group consisting of i) a metal mesh or metal plate of at least one selected from a group consisting of the electric resistance-heat generating materials and the heat-conductive materials with or without several types of holes; ii) a thin layer film formed by coating at least one material selected from a group consisting of the electric resistance-heat generating materials and the heat-conductive materials on at least one side of a polymer resin film (or sheet); iii) a thin layer film formed by-infiltrating at least one material selected from a group consisting of the electric resistance-heat generating materials and heat-conductive materials into a polymer resin film (or sheet); and iv) any combinations of i, ii, or iii.

In the thin film of iii, it is preferable in view of dispersibilty that the electric resistance-heat generating material or the heat-conductive material should be infiltrated in the form of powder. It is also preferable that the amount of the electric resistance-heat generating material or the heat-conductive material used in the thin film of ii and iii is 0.5 to 80 parts by weight per 100 parts by weight of the polymer resin film (or sheet) or polymer resin for forming sheet. If the used amount of the electric resistance-heat generating material or the heat-conductive material is less than 0.5 part by weight, the thermal characteristic of the binding layer is deficient to decrease the adhesive force between the base layer and the exterior layer. If the used amount is more than 80 parts by weight, sheet (film) molding cannot be performed. The polymer resin used in i through iv may be at least one material selected from a group consisting of thermoplastic resins and thermal adhesive resins.

The thermoplastic resin used in this invention may be selected from the group consisting of polyethylene (PE, HDPE, LDPE, LLDPE, VLDPE, ULDPE, UHDPE), polypropylene (PP co-polymer, PP homo-polymer, and PP ter-polymer), polyvinylchloride (PVC), polystyrene (PS), polymethyl-metacrylate (PMMA), acrylobutadienestyrene (ABS) resin, styrene-acrylonitrile (SAN) resin, K-resin, SBS block co-polymer resin, PVDC resin, EVA resin, acryl resin, butral resin, silicone resin, polyamide (PA, PA6, PA66, PA46, PA610, PA6/66, PA6/12, PA6T, PA12, PA1212, PAMXD6) resin, ethylenetetrafluoroethylene co-polymer, liquid crystal polymer, polybutyleneterephthalate, polyetheretherketone, polyetherketone, polyetherketoneketone, polyethylenenaphthalene, polyethyleneterephthalate, polyimide, polyacetal, polyamideimide, polyphenyleneether, polyphenyleneoxide, polycarbonate, polyphenylsulfide, polysulfone, polythioethylsulfone, polytetrafluoroethylene, polyethersulfone, polyetherimide, ethylenepropylenediene monomer rubber, ethylenepropylene rubber, styrenebutadiene rubber, butadiene rubber, ethylenepropyleneoctene rubber, isoprene rubber, acrylonitrile rubber, and silicone rubber.

The thermal adhesive resin used in this invention may be a modified resin with a polar functional group or groups, and selected particularly from a group consisting of acrylic acid-modified olefin resin, maleic acid-modified olefin resin, chloride-modified olefin resin, silane-modified olefin resin, ionomer resin, nylon-modified olefin resin, epoxy-modified resin, ethylenevinylalcohol (EVOH) resin, ethylenevinylacetate resin, hot melt adhesive resin, and their mixtures and combinations.

The base layer may be formed with the thermoplastic resin as described above or a composite resin formed by mixing the thermoplastic resin with at least one filler reinforcing heat-durability.

The filler used in this invention may be selected from a group consisting of glass fillers (glass fibers, glass mats, glass beads, milled glass fibers, and chopped glass fibers), mica, talc, wollastonite, calcium carbonate, asbestos, kaolin, carbon fibers, nylon fibers, vegetable fibers, sawdust, clay, silica, graphite, fly ashes, waste papers, and waste fibers.

If the exterior layer consists of a single layer, the exterior layer is formed with at least one material selected from a group consisting of thermoplastic resins, thermal adhesive resins, and composite resins including at least one filler and at least one resin selected from a group consisting of thermoplastic resins and thermal adhesive resins.

If the exterior layer has a multi-layer structure, the lower layer is bound to the binding layer and formed with a polymer resin which is selected from a group consisting of thermoplastic resins, thermal adhesive resins, and composite resins including at least one filler and at least one resin selected from a group consisting of thermoplastic resins and thermal adhesive resins; and the upper layer has a single or multi-layer structures and is formed with at least one material selected from a group consisting of wood or metal thin films, papers, natural textiles, synthetic textiles, artificial leathers, felts, nonwoven fabrics, foaming sheets, honeycomb sheets, polymer sheets or films.

Various additives may be added to the polymer resin used for forming the base, exterior, and binding layers. The additives can be suitably selected according to molding method and use. The amounts of the additives vary according to the additive purpose.

The additive used in this invention may be selected from the group consisting of heat-stabilizing agents, antioxidants, ultraviolet ray-stabilizing agents, carbon black, conductive materials, nucleus agents, release agents, fire retardants, agents for preventing static electricity, processing-assistant agents, coloring agents, functional pigments or dyes, cross-linking agents, plasticizer, and vulcanizing agents.

In the thermoplastic resin-laminated structure of the present invention, the thickness of the base layer may vary according to the use and molding method, and thus not limited to specific range. The thickness of the exterior layer may be maximally 200 mm regarding a multi-layer sheet having cushion function, and preferably less than 50 mm to exhibit good-adhesive power at curved parts of binding face. The thickness of binding layer is preferably less than half of the thickness of exterior layer to obtain good appearance of the exterior layer in the completed laminated structure.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
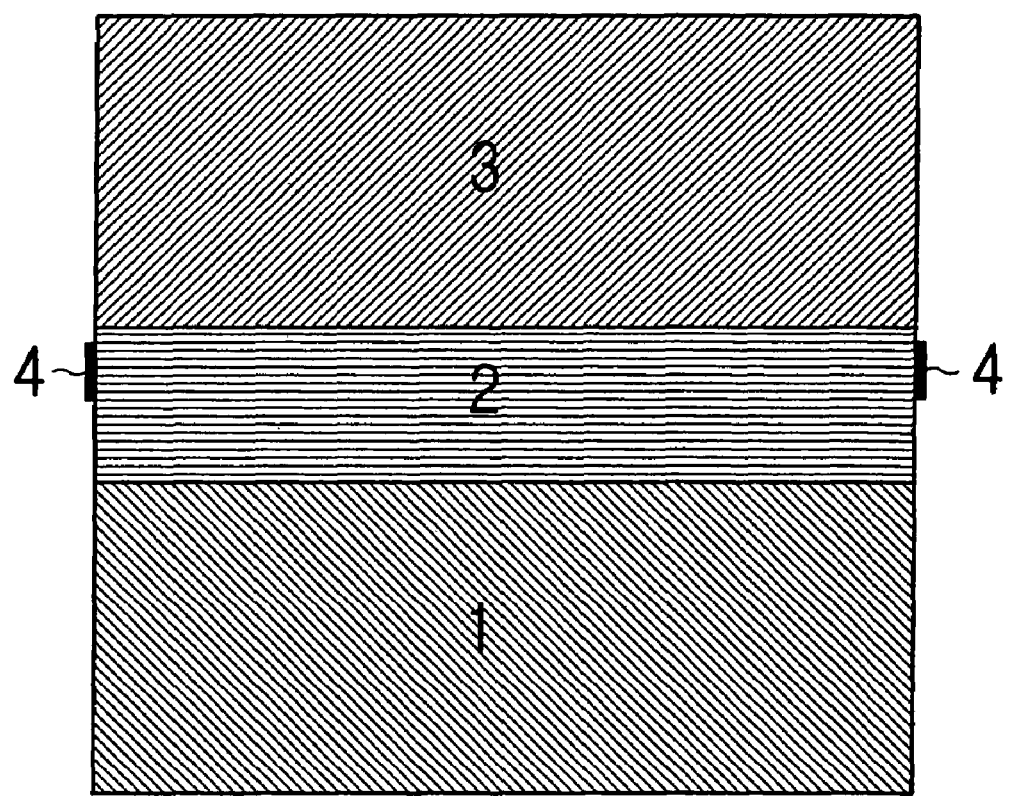
FIG. 1 is a cross-sectional view showing an example of the thermoplastic resin-laminated structure according to the present invention.

Hereinafter, the preferred embodiments of the present invention will be explained in more detail with reference to the accompanying drawings.

Firstly, the principle of the present invention will be described.

As generally known recycling of a laminated structure is based on the chemical similarity of the polymer resin ingredients in the base layer and the exterior layer of the resin-laminated structure. However, the recycling utility of the resin-laminated structure substantially results from the ease in separating materials consisting of the base and exterior layers. When the ingredients of the base and exterior layers are different, for example, the base layer is formed with acrylonitrile-butadiene-styrene copolymer and composite resin of polycarbonate while the exterior layer is formed with polyurethane resin (or polyvinylchloride resin), separation between the base and exterior layers is not performed easily, so the recycling utility of the resin-laminated structure is not good. Therefore, if each of the base and exterior layers can be easily separated from the other, the copolymer and the composite resin of polycarbonate can be used as very good thermoplastic resins for recycling.

Regarding the prior art such as vacuum molding and thermal adhesive molding, which are used because the binding between the base and exterior layers is achieved by irreversible means. Moreover, concerning a physical chemistry, vacuum molding and thermal adhesive are not easily separated nor do they have a good recycling utility of the resin-laminated structure. However, in this invention, the binding between the base and exterior layers is achieved via a reversible binding method such that their binding and separation easily occur, resulting in the resin-laminated structure having good recycling utility.

In addition to this view, and as generally known the adhesive strength between the base and exterior layers is based on the chemical properties of the objects to be adhered. However, substantially the adhesive strength is tightly related to the miscibilities of the objects to be adhered and the mobilities at the boundary. For example, water and alcohol may have similar miscibility coefficients that enable the substances to mix well with each other (namely, to bind well to each other). However, in contrast water and oil have very different miscibility coefficients causing the substances not to mix well with each other (namely, not to bind well to each other). Similarly, ice does not bind to other ice because of a low mobility of water molecules at their boundary.

Use of an adhesive agent according to the prior art will decrease the difference between the miscibility coefficients of the objects to be adhered and thus increase the adhesive strength between the objects.

The important fact in the binding between the base and exterior layers is not that the binding feature is affected by the entire objects to be adhered, but rather affected by the boundary features between the objects to be adhered. Particularly, the boundary features are very important for binding the polymer resin molding materials, which are generally known as having poor thermal conductivity. Therefore, in the fabrication of a polymer resin-laminated structure, supplying heat, pressure, and vacuum adsorption to the entire object to be adhered through a mold causes deformation of the previously molded base and exterior layers as well as wastes energy.

In this view, if a reversible binding method can be performed only at the binding boundary, the results can be obtained whereby pretreatment such as preheating is not necessary, the process becomes simple, and the resin-laminated structure with excellent recycling utility and adhesive strength is obtained.

The resin-laminated structure of the present invention can be formed by the method characterized in that a binding layer including electric resistance-heat generating material and/or heat-conductive material intervenes between a base layer and an exterior layer, and electricity or heat is supplied through a connection terminal or terminals equipped at the binding layer to cause fusion of the objects to be adhered at the boundary between the base and exterior layers, thus binding the objects. In comparison with the conventional system, this invention intentionally and reversibly controls heat-generation (namely, fusion of resin) and cooling (namely, solidification of resin) at the binding boundary. Therefore, the resin-laminated structure according to the present invention improves adhesive strength between the base and exterior layers and uses heat to separate the base and exterior layers thereby providing good recycling utility of material.

Now, the preferred embodiments of the present invention will be explained in more detail with reference to the accompanying drawings. FIG. 1 is a cross-sectional view showing an example of the thermoplastic resin-laminated structure according to the present invention.

As shown in FIG. 1, the thermoplastic resin-laminated structure according to the present invention includes a base layer 1, a binding layer 2 formed on the base layer 1, and an exterior layer 3 formed on the binding layer 2. At least one connection terminal 4 for supplying electricity or heat is mounted on a part of the binding layer 2. Particularly, the at least one terminal connection is located on an edge portion of the resin laminated structure that is exposed to the outside.

The base layer used in the present invention can be fabricated into various forms using known molding methods such as injection molding, sheet molding, extrusion molding, blow molding, or compression molding. The base layer may be formed with polymer resins such as thermoplastic resins or composite resins. Composite resins are formed by mixing thermoplastic resins with fillers.

The thermoplastic resin used in this invention may be selected from the group consisting of polyethylene (PE, HDPE, LDPE, LLDPE, VLDPE, ULDPE, UHDPE), polypropylene (PP co-polymer, PP homo-polymer, and PP ter-polymer), polyvinylchloride (PVC), polystyrene (PS), polymethylmetacrylate (PMMA), acrylobutadienestyrene (ABS) resin, styrene-acrylonitrile (SAN) resin, K-resin, SBS block co-polymer resin, PVDC resin, EVA resin, acryl resin, butral resin, silicone resin, polyamide (PA, PA6, PA66, PA46, PA610, PA6/66, PA6/12, PA6T, PA12, PA1212, PAMXD6) resin, ethylenetetrafluoroethylene co-polymer, liquid crystal polymer, polybutyleneterephthalate, polyetheretherketone, polyetherketone, polyetherketoneketone, polyethylenenaphthalene, polyethyleneterephthalate, polyimide, polyacetal, polyamideimide, polyphenyleneether, polyphenyleneoxide, polycarbonate, polyphenylsulfide, polysulfone, polythioethylsulfone, polytetrafluoroethylene, polyethersulfone, polyetherimide, ethylenepropylene diene monomer rubber, ethylenepropylene rubber, styrenebutadiene rubber, butadiene rubber, ethylenepropyleneoctene rubber, isoprene rubber, acrylonitrile rubber, and silicone rubber.

The filler used in this invention may be selected from the group consisting of glass fillers (glass fibers, glass mats, glass beads, milled glass fibers, and chopped glass, fibers), mica, talc, wollastonite, calcium carbonate, asbestos, kaolin, carbon fibers, nylon fibers, vegetable fibers, sawdust, clay, silica, graphite, fly ashes, waste papers, and waste fibers.

Independently, the exterior layer used in this invention may be fabricated with a sheet or film formed as a single or multi-layer structure according to known molding methods, such as sheet molding, film molding, foam sheet molding or laminated co-compression molding.

If the exterior layer consists of a single layer, the exterior layer is formed with at least one polymer resin selected from a group consisting of materials used for forming the base layer and thermal adhesive resins.

The thermal adhesive resin used in this invention may be a modified resin with a polar functional group or groups, and particularly selected from a group consisting of acrylic acid-modified olefin resin, maleic acid-modified olefin resin, chloride-modified olefin resin, silane-modified olefin resin, ionomer resin, nylon-modified olefin resin, epoxymodified resin, ethylenevinylalcohol (EVOH) resin, ethylenevinylacetate resin, hot melt adhesive resin, and their mixtures and combinations.

If the exterior layer has a multi-layer structure, the lower layer is bound to the binding layer and formed with at least one polymer resin selected from a group consisting of materials used for forming the base layer and thermal adhesive resins, and the upper layer has single or multi-layer structure, and is formed with at least one material selected from the group consisting of woods or metal thin films, papers, natural textiles, synthetic textiles, artificial leathers, felts, nonwoven fabrics, foaming sheets, honeycomb sheets, polymer sheets or films.

The binding layer is located between the base and exterior layers and functions to bind the base layer to the exterior layer in a heat generating method such as an electric resistance or heat-conductive method. The binding layer formed using electric resistance may be fabricated as follows:

Firstly, a sheet of a single or multi-layer structure is prepared with electric resistance heat generating material, which is a material used to generate heat by electric resistance. Accordingly, any material may be used as an electric resistance-heat generating material if it generates heat through electric resistance. The examples include tungsten (W), nickel (Ni), chromium (Cr), silicon (Si), aluminum (Al), carbon (C), Iron (Fe), magnesium (Mg), zinc (Zn), titanium (Ti), manganese (Mn), cobalt (Co), vanadium (V), zirconium (Zr), molybdenum (Mo), copper (Cu), silver (Ag), cadmium (Cd), tin (Sn), lead (Pb), stainless steel, their alloys, and their mixtures.

The binding layer is formed from a type of material selected from a group consisting of i) a metal mesh or metal plate of at least one material selected from a group consisting of the electric resistance-heat generating materials with or without several types of holes; ii) a thin layer film formed by coating at least one material selected from the group consisting of the electric resistance-heat generating materials on at least one side of a polymer resin film (or sheet); iii) a thin layer film formed by infiltrating at least one material selected from the group consisting of the electric resistance-heat generating materials with a polymer resin film (or sheet); and iv) any combinations of materials i, ii, and iii.

Preferably the metal used in this invention should have a Curie temperature higher than the melting point of a polymer resin for constructing the binding boundary of the base or exterior layer.

The polymer resin used in the binding layer may be selected from a group consisting of materials for forming the base layer, materials for forming the exterior layer, and thermal adhesive resins, and preferably may be a thermal adhesive resin to obtain excellent adhesive ability.

After the sheet of binding layer is fabricated, two terminals connectable to a power supply are molded to the sheet to obtain a binding layer that can adhere to the base and exterior layers via the electricity resistance-heat generating method. The position of the terminal is not fixed but can be located, for example, at an edge portion of the sheet that is to be exposed to the outside.

The binding layer formed via the heat-conductive method may be fabricated as follows:

Firstly, a sheet of single or multi-layer structure is prepared with heat-conductive material. At this time, any material may be used as a heat-conductive material if it has heat conductive property. The examples include tungsten (W), nickel (NO, chromium (Cr), silicon (Si), aluminum (Al), carbon (C), Iron (Fe), magnesium (Mg), zinc (Zn), titanium (Ti), manganese (Mn), cobalt (Co), vanadium (V), zirconium (Zr), molybdenum (Mo), copper (Cu), silver (Ag), cadmium (Cd), tin (Sn), lead (Pb), stainless steel, their alloys, and their mixtures.

Similarly to the binding layer formed according to the above-mentioned electric resistance-heat generating method, the binding layer formed via the heat conductive method is formed with materials selected from a group consisting of i) a metal mesh or metal plate of at least one material selected from a group consisting of heat-conductive materials with or without several types of holes; ii) a thin layer film formed by coating at least one material selected from the group consisting of the heat-conductive materials on at least one side of a polymer resin film (or sheet); iii) a thin layer film formed by infiltrating at least one material selected from the group consisting of the heat-conductive materials into a polymer resin film (or sheet); and iv) any combinations of material i, ii, and iii.

The polymer resin used in the heat-conductive manner may be selected like that in the electric resistance-heat generating manner.

After the sheet of binding layer is fabricated, at least one terminal connectable to a heat source is mounted on the sheet to obtain a binding layer that adheres to the base and exterior layers via a heat-conductive method.

If possible, the electric resistance-heat generating material and the heat-conductive material may be used in combination with each other.

Various additives may be added to the polymer resin used for forming the base, exterior, and binding layers. The additives can be suitably selected according to molding method and use. The amounts of the additives vary according to the additive purpose.

The additive used in this invention may be selected from the group consisting of heat-stabilizing agents, antioxidants, ultraviolet ray-stabilizing agents, carbon black, conductive materials, nucleus agents, release agents, fire retardants, agents for preventing static electricity, processing-assistant agents, coloring agents, functional pigments or dyes, cross-linking agents, plasticizer, and vulcanizing agents.

Instead of fabricating the exterior layer and the binding layer independently, the combined layers may be fabricated together by using a sheet molding apparatus. In this example, the exterior and binding layers may be also previously adhered in the form of a multi-layer sheet, which allows rolling work and the width of the exterior layer to be similar to the width of the binding layer. Advantages of this process include a decreased number of processes and enhanced productivity in comparison with independent fabrications for the exterior and binding layers.

Now, binding the fabricated exterior and base layers will be described below.

In an initial step, the binding layer including the electric resistance-heat generating material or heat-conductive material, is placed on the base layer, and the exterior layer is placed on the binding layer so the stacked layers are then fixed in a mold.

When electricity or heat is supplied through the terminal or terminals to the binding layer, heat is generated at the binding boundary between the base and exterior layers. The generated heat melts the polymer resin in the base and exterior layers at the binding boundary between the two layers. The mobility of the melted polymer resin is increased to achieve melting adhesion between the base and exterior layers. When the polymer resin is sufficiently melted at the binding boundary between the base and exterior layers, the supply of electricity or heat from the external source is cut off to cool the melted polymer resin and then to obtain the thermoplastic resin-laminated structure.

The resin-laminated structure according to the present invention is low in deformation and has a good surface quality, thermal durability, acoustic absorptivity, heat-shielding property, and impulse-durability, as well as, can be easily and simply fabricated. A thermoplastic resin-laminated structure, therefore, can be used in materials, such as, interior automotive trims, acoustic absorptive members, heat-insulating members, lagging members, protective coating members, anti-vibration members, and sound-blocking members for civil engineering and construction, anti-vibration and sound-blocking members for sewage and water pipe, soundproofing members for hot-water "ondol" (i. e., Korean word indicating floor heating system), plastic furniture, various multi-layer mats, handles, sofas, chairs, various toys, middle soles of shoes, and golf bags.

Hereinafter, the present invention will be illustrated in detail with several examples, but it should not be construed that the scope of the present invention is limited to the examples.

EXAMPLE 1

A resin-laminated structure is fabricated with the electric resistance-heat generating manner according to the present invention as follows:

A composite resin is prepared by adding 20% by weight of a glass fiber to a polypropylene copolymer and by extruding the mixture with a dual-axial extruding machine. A base layer is fabricated by injecting the composite resin into an injection molding apparatus.

A Lameskin product of soft coating sheet available from Montell Company was used as an exterior layer. The Lameskin product is a sheet with a triple-layer structure of toughened polyolefin (TPO; skin layer)/foaming polypropylene/polypropylene.

Independently, a metal mesh is fabricated with a 1 mm×1 mm square hole of using metal wires of stainless steel having a 0.1 mm diameter. Two electric terminals are equipped at two ends of the metal mesh to use as a binding layer.

The base, binding and exterior layers are thereafter placed into a cavity of the press molding apparatus, and electricity is supplied through the terminals to the binding layer in order to adhere the base and exterior layers to one another so that the resin-laminated structure can be formed.

In measuring the recycling utility of the resin-laminated structure, electricity is supplied to the binding layer of the completed resin-laminated structure via the terminals, causing the base and exterior layers to separate from one another. The cut section of the separated base layer may then be observed through the naked eye.

EXAMPLE 2

A resin-laminated structure is fabricated via the heat-conductive method according to the present invention as follows:

A composite resin is prepared by adding 20% by weight of a glass fiber to a acrylonitrile butadiene styrene resin and by extruding the mixture with a dual-axial extruding machine. A base layer is fabricated by injecting the composite resin into an injection molding apparatus.

An exterior layer is fabricated with the sheet forming a double-layer structure of soft polyvinylchloride and foaming urethane.

Independently, a laminated sheet is fabricated using a laminated molding apparatus in the form of a metal mesh of copper adhered to a hot melt adhesive resin sheet. The hot melt adhesive resin sheet includes 30% by weight of conductive carbon black. At least one terminal is mounted to the laminated sheet to form a binding layer.

The base, binding and exterior layers are thereafter placed into a cavity of the press molding apparatus, and heat is supplied by a heater via the at least one terminal to the binding layer so that the base and exterior layers adhere to one another thus forming the resin-laminated structure.

In measuring the recycle utility of the resin-laminated structure, heat is supplied through the terminals of the binding layer of the completed resin-laminated structure by a heater causing the base and exterior layers to separate from one another. The cut section of the separated base layer may then be observed through the naked eye.

COMPARATIVE EXAMPLE 1

In comparison with example 1, a resin-laminated structure is fabricated using the thermal adhesive molding method according to the prior art as follows:

A composite resin is prepared by adding 20% by weight of a glass fiber to a polypropylene copolymer and by extruding the mixture with a dual-axial extruding machine. A base layer was fabricated by injecting the composite resin into an injection molding apparatus.

A Lameskin product of soft coating sheet available from Montell Company is used as an exterior layer. The Lameskin product is a sheet with a triple-layer structure of toughened polyolefin (TPO; skin layer)/foaming polypropylene/polypropylene.

Firstly, an adhesive agent of chloride-modified resin is coated on the base layer.

A thermal press molding apparatus is used. The base layer is placed into a cavity of the mold and pre-heated to a temperature of 150° C. The mold is then continuously heated at a temperature of 150° C.

Independently, the exterior layer is pre-heated to a temperature of 150 to 180° C. using a heating chamber.

The exterior layer is placed on top of the base layer under the condition that the pre-heating temperature is maintained. A thermal press molding is then performed to complete the resin-laminated structure.

In measuring the recycling utility of the resin laminated structure, the completed resin-laminated structure is pre-heated to a temperature of 150 to 200° C., and the base and exterior layers are separated from one another. The cut section of the separated base layer is then observable to the naked eye for assessment.

COMPARATIVE EXAMPLE 2

In order to compare with the example 2, a resin-laminated structure is fabricated with the vacuum-molding manner according to the prior art as follows:

A composite resin is prepared by adding 20% by weight of a glass fiber to a acrylonitrile butadiene styrene resin and by extruding the mixture with a dual-axial extruding machine. A base layer is fabricated by injecting the composite resin into an injection molding apparatus.

Firstly, a soft polyvinylchloride sheet is fabricated using a sheet molding apparatus.

The soft polyvinylchloride sheet is vacuum-molded using a vacuum molding apparatus to make a skin layer with a form of product.

The base layer is placed in the cavity of a foaming compression molding apparatus pre-heated to a temperature of 100 to 150° C., and continuously heated at the pre-heated temperature. The skin layer fabricated with the vacuum molding is placed over the preheated base layer, and then the liquefied raw material for foaming polyurethane (polyol and isocyanate) is injected between the base and skin layers.

The polyol and isocyanate is compressed for predetermined hours in the foaming compression mold to complete the cross-link polymerization and foaming reaction obtaining the resin-laminated structure.

In measuring the recycling utility of the resin laminated structure, the completed resin-laminated structure is pre-heated to a temperature of 150 to 200° C., and the base and exterior layers are then separated from one another. The cut section of the separated base layer is then observable to the naked eye for assessment.

The properties of the resin-laminated structures fabricated in the examples 1 and 2 and the comparative examples 1 and 2 are measured according to the methods as described below. The results are shown in Table 1.

(1) The boundary adhesive strength between the base and exterior layers is measured when a test piece is prepared having a 25 mm width and 150 mm length. After one end of the test piece about 30 mm along-the direction of length is stripped off, the test piece is bitten by a tensile force tester and then an attempt is made to strip off with a tensile velocity of 200 m/min to measure the boundary adhesive strength.

(2) Impulse-durability is measured according to the method of ASTM D 256.

(3) Bending strength is measured according to the method of ASTM D 790.

(4) Ease of breaking up (recycling utility) is measured when each of the base and exterior layers is separated respectively, and then the amount of remaining pollution of the exterior layer material at the boundary of the base layer is observed by the naked eye.

TABLE 1

| | Ex. 1 | Ex. 2 | Com. Ex. 1 | Com Ex. 2 |
|---|---|---|---|---|
| Boundary adhesive strength (kg/cm²) | Not strip | Not strip | 15 | Not strip |
| Impulse-Durability (kg/cm) | 67 (no break) | 58 (no break) | 35 (break) | 42 (partial break) |
| Bending strength (kg/cm²) | 1150 | 1350 | 950 | 1150 |
| Ease of breaking up | Grade 1 | Grade 1 | Grade 2 | Extra grade |

The measured grade abut ease of breaking up
Grade 1 = that the remaining pollution of the exterior layer material was not at the boundary of the separated base layer.
Grade 2 = that the remaining pollution of the exterior layer material was at the boundary of the separated base layer.
Extra grade = that the base and exterior layers were not separated or the exterior layer was damaged and its art was only separated.

As shown-in Table 1, the resin-laminated structure of comparative example 1 has good recycling utility, but poor boundary adhesive strength and impulse-durability. The resin-laminated structure of comparative example 2 has good boundary adhesive strength and impulse-durability, but poor recycling utility. However, the resin-laminated structures of examples 1 and 2 all have good recycling utility (ease of breaking up), impulse-durability, bending strength and boundary adhesive strength.

The items as described below regarding the fabrications of the resin-laminated structures according to the examples 1 and 2 and the comparative examples 1 and 2 were compared and analyzed. The results are shown in Table 2.

TABLE 2

| Comparative Items | Ex. 1 | Ex. 2 | Com. Ex. 1 | Com Ex. 2 |
|---|---|---|---|---|
| Expensive vacuum equipment | Not necessary | Not necessary | Not necessary | Necessary |
| Preheating process | Not necessary | Not necessary | Necessary | Necessary |
| Deformation at preheating | Not exist | Not exist | Exist | Exist |
| Molding pressure | Low | Low | High | High |
| Molding temperature | Low | Low | High | High |
| Molding workability | Good | Good | Poor (malodor of adhesive) | Average |
| Foaming weakness | Not exist | Not exist | Not exist | Exist |

TABLE 2-continued

| Comparative Items | Ex. 1 | Ex. 2 | Com. Ex. 1 | Com Ex. 2 |
|---|---|---|---|---|
| Adhesive weakness | Not exist | Not exist | Exist | Not exist |
| Productivity | Good | Good | Poor | Average |
| Process cost | Low | Low | Average | High |

As shown in Table 2, unlike the fabrication of the resin-laminated structures according to the comparative examples 1 and 2, the binding process of the base and exterior layers can be performed under low temperature using a mold at room temperature. Therefore, the binding processes of examples 1 and 2 are so applicable to injection molding so that the resin-laminated structure can be fabricated using the same injection molding used for forming the base layer without any separate processes proceeding at high temperature and high pressure.

The method for preparing the thermoplastic resin-laminated structure according to the present invention does not require a preheating process nor expensive vacuum equipment. It can be also performed at room temperature and low pressure to simplify the processes and to increase productivity. It also adheres the base and exterior layers without any organic adhesives between the base and exterior layers, thus providing a pleasant work atmosphere and use conditions. It also does not generate negative effects regarding any foaming agents and adhesives, because it does not use them. It also provides good recycling performance of materials, because the binding and breaking up of the base and exterior layers can be intentionally undertaken through melting the resin at the binding boundary by supplying electricity or heat through the terminals of the binding layer.

Particularly, the binding method of the present invention is useful in binding the same kind materials of nonpolar polymer resins such as polyolefins known to have poor adhesive strength.

Regarding the binding layer that includes electric resistance-heat generating or heat conductive metal mesh in the thermoplastic resin-laminated structure according to the present invention, the metal mesh functions as a high resistance to the external impulse to increase impulse-durability. Therefore, when the resin-laminated structure according to the present invention is applied to a product required to have impulse-durability, for example, interior automotive trims such as an instrument panel, the safety of passengers is greatly enhanced in the result of a car crash.

The thermoplastic resin-laminated structure of the present invention also has excellent properties such as surface quality, thermal durability, acoustic absorptivity, heat-shielding property, and impulse-durability. Thus, thermoplastic resin-laminated structure can be used as an element in manufacturing interior automotive trims, acoustic absorptive members, heat-insulating members, lagging members, protective coating members, anti-vibration members, and sound-blocking members for civil engineering and construction, anti-vibration and soundblocking members for sewage and water pipe, soundproofing members for hot-water "ondol", plastic furniture, various multi-layer mats, handles, sofas, chairs, various toys, middle soles of shoes, and golf bags.

While the present invention has been particularly shown and described with reference to preferred embodiments thereof, it will be appreciated that many variations, modifications and other applications of the present invention may be made.

What is claimed is:

1. A recyclable thermoplastic resin-laminated structure for interior automotive trim, comprising:
    an exterior layer having a thickness of less than 50 mm;
    a base layer; and
    a binding layer placed between the exterior layer and the base layer, including at least one material selected from a group consisting of electric resistance-heat generating materials and heat-conductive materials, wherein the binding layer has a thickness of less than half of the thickness of the exterior layer and has at least one connection terminal at a certain region for supplying at least one of electricity and heat,
    wherein the binding layer is formed with one material selected from a group consisting of metal mesh or metal plate, a film formed by coating on at least one side of a polymer resin film at least one of an electric resistance-heat generating material and a heat-conductive material having a weight 0.5% to 80% of the weight of the polymer resin film, and combinations thereof, and wherein the exterior layer and the base layer can be separated easily by melting the inner surfaces thereof with heat generated from the binding layer.

2. The recyclable thermoplastic resin-laminated structure for interior automotive trim according to claim 1, wherein the electric resistance-heat generating material has a Curie temperature higher than the melting point of a polymer which constitutes the base or exterior layer, and is selected from a group consisting of tungsten (W), nickel (Ni), chromium (Cr), carbon (C), iron (Fe), titanium (Ti), stainless steel alloys of at least one of tungsten (W), nickel (Ni), chromium (Cr), titanium (Ti), and mixtures of the group at least two of tungsten (W), nickel (Ni), chromium (Cr), carbon (C), iron (Fe), titanium (Ti).

3. The recyclable thermoplastic resin-laminated structure for interior automotive trim according to claim 1, wherein the heat-conductive material is selected from a group consisting of aluminum (Al), carbon (C), zinc (Zn), manganese (Mn), copper (Cu), silver (Ag), tin (Sn), lead (Pb), stainless steel alloys of at least one of aluminum (Al), zinc (Zn), manganese (Mn), copper (Cu), silver (Ag), tin (Sn), lead (Pb), and mixtures of at least two of aluminum (Al), carbon (C), zinc (Zn), manganese (Mn), copper (Cu), silver (Ag), tin (Sn), lead (Pb).

4. The recyclable thermoplastic resin-laminated structure for interior automotive trim according to claim 1, wherein the polymer resin is a thermoplastic resin.

5. The recyclable thermoplastic resin-laminated structure for interior automotive trim according to claim 1, wherein the base layer is formed with composite resins including at least one filler and at least one thermoplastic resin.

6. The recyclable thermoplastic resin-laminated structure for interior automotive trim according to claim 1, wherein when the exterior layer consists of a single layer, the exterior layer is formed with a polymer resin that is at least one material selected from a group consisting of thermoplastic resins and thermal adhesive resins.

7. The recyclable thermoplastic resin-laminated structure for interior automotive trim according to claim 1, wherein when the exterior layer has a multi-layer structure, the lower layer is bound to the binding layer and formed with a polymer resin which is at least one material selected from a group consisting of thermoplastic resins and thermal adhesive resins, the upper layer has single or multi-layer structure, and is formed with at least one material selected from a group consisting of natural textiles, synthetic textiles, artificial leathers, felts, nonwoven fabrics, foaming sheets, honeycomb sheets, polymer sheets or films.

8. The recyclable thermoplastic resin-laminated structure for interior automotive trim according to claim 1, wherein the exterior layer, the base layer or the binding layer includes at least one thermoplastic resin selected from a group consisting of polyethylene (PE), polypropylene (PP copolymer, PP homo-polymer, and PP ter-polymer), polystyrene (PS), acrylobutadienestyrene (ABS) resin, styrene-acrylonitrile (SAN) resin, K-resin, SBS block co-polymer resin, EVA resin, silicone resin, polyamide (PA) resin, polybutyleneterephthalate, polyethyleneterephthalate, polyacetal, polyphenyleneether, polyphenyleneoxide, polycarbonate, polyphenylsulfide, ethylenepropylene diene monomer rubber, ethylenepropylene rubber, styrenebutadiene rubber, butadiene rubber, ethylenepropyleneoctene rubber, isoprene rubber, acrylonitrile rubber, and silicone rubber.

9. The recyclable thermoplastic resin-laminated structure for interior automotive trim according to claim 1, wherein the exterior layer includes at least one thermal adhesive resin selected from a group consisting of acrylic acid-modified olefin resin, maleic acid-modified olefin resin, chloride-modified olefin resin, silane-modified olefin resin, ionomer resin, nylon-modified olefin resin, epoxy-modified resin, ethylenevinylalcohol (EVOH) resin, ethylenevinylacetate resin, hot melt adhesive resin, and any mixtures of the group.

10. The recyclable thermoplastic resin-laminated structure for interior automotive trim according to claim 1, wherein the base layer includes at least one filler selected from a group consisting of glass fillers, mica, talc, wollastonite, calcium carbonate, kaolin, vegetable fibers, sawdust, clay, silica, graphite, fly ashes, waste papers, and waste fibers.

11. The recyclable thermoplastic resin-laminated structure for interior automotive trim according to claim 1, wherein the exterior layer, the base layer or the binding layer includes at least one additive selected from a group consisting of heat-stabilizing agents, antioxidants, ultraviolet ray-stabilizing agents, carbon black, conductive materials, nucleus agents, release agents, fire retardants, agents for preventing static electricity, processing-assistant agents, coloring agents, functional pigments or dyes, cross-linking agents, plasticizer, and vulcanizing agents.

12. The recyclable thermoplastic resin-laminated structure for interior automotive trim according to claim 1, wherein the thermoplastic resin-laminated structure is at least used as an element in manufacturing interior automotive trims, acoustic absorptive members, heat-insulating members, lagging members, protective coating members, anti-vibration members, and sound blocking members for civil engineering and construction, anti-vibration and sound-blocking members for sewage and water pipe, soundproofing members for hot-water ondol, plastic furniture, various multi-layer mats, handles, sofas, chairs, various toys, middle soles of shoes, and golf bags.

* * * * *